(12) United States Patent
Schwesinger et al.

(10) Patent No.: US 8,745,664 B2
(45) Date of Patent: Jun. 3, 2014

(54) NON-GRID TELEVISION GUIDE

(75) Inventors: Mark Schwesinger, Bellevue, WA (US);
Cory Cirrincione, Redmond, WA (US);
Joseph McClanahan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 12/056,117

(22) Filed: Mar. 26, 2008

(65) Prior Publication Data
US 2009/0249398 A1 Oct. 1, 2009

(51) Int. Cl.
*G06F 3/00* (2006.01)
*G06F 13/00* (2006.01)
*H04N 5/445* (2011.01)

(52) U.S. Cl.
USPC ............... 725/44; 725/39; 725/40; 725/43; 348/552; 348/553; 348/563; 348/564; 715/818; 715/819; 715/820

(58) Field of Classification Search
USPC .......................................... 725/39, 40, 43, 44
See application file for complete search history.

(56) References Cited

U.S. PATENT DOCUMENTS

| | | | |
|---|---|---|---|
| 6,262,722 B1 | 7/2001 | Allison | |
| 6,857,128 B1 | 2/2005 | Borden, IV | |
| 7,137,135 B2 | 11/2006 | Schein | |
| 7,293,276 B2 | 11/2007 | Phillips | |
| 7,900,228 B2 * | 3/2011 | Stark et al. ................ | 725/45 |
| 2004/0181805 A1 * | 9/2004 | Sullivan ..................... | 725/39 |
| 2005/0289593 A1 | 12/2005 | Spilo | |
| 2006/0136246 A1 | 6/2006 | Tu | |
| 2006/0239640 A1 | 10/2006 | Watanabe et al. | |
| 2007/0250864 A1 | 10/2007 | Diaz Perez | |
| 2007/0300257 A1 | 12/2007 | Ryu | |
| 2008/0162545 A1 * | 7/2008 | Austin et al. ............... | 707/103 R |
| 2008/0177727 A1 * | 7/2008 | Pickelsimer ................ | 707/5 |

FOREIGN PATENT DOCUMENTS

WO  03069457  8/2003

OTHER PUBLICATIONS

Consumer Electronics Firms Eye New EPG as Way to Enhance Product Appeal http://www.screenplaysmag.com/Editor/Article/tabid/96/articleType/ArticleView/articleId/141/Default.aspx.
Navigating your TV: The Usability of Electronic Programme Guides http:///www.serco.co.uk/Images/EPG%20Paper_tcm3-2248.pdf.
Interactive Program Gude http:///www.cse.buffalo.edu/~alphonce/OOPSLA2003/KillerExamples/PreSubmissions/SterKin/InteractiveProgramGuide.doc.

* cited by examiner

*Primary Examiner* — Kunal Langhnoja
(74) *Attorney, Agent, or Firm* — Micah Goldsmith; Leonard Smith; Micky Minhas

(57) ABSTRACT

The technology is a system and method for displaying a non-grid electronic program guide. Available television channels and episodes are identified in a program guide database. The available television channels are displayed in a first window of the guide. The television series associated with the available episodes are displayed in a second window of the guide. In response to selecting one of the available television channels, the available television episodes are narrowed to the television series that air on the selected television channel. In response to the selection of one of the television series, episodes of the selected television series are displayed in a third window of the guide. Selecting an episode displays the episode information in a fourth window of the guide.

17 Claims, 7 Drawing Sheets

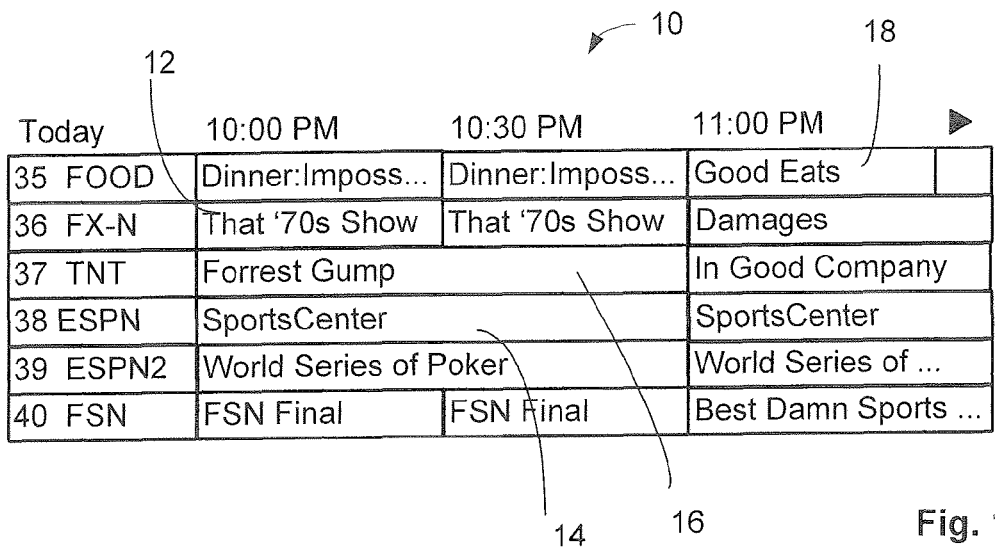
Fig. 1
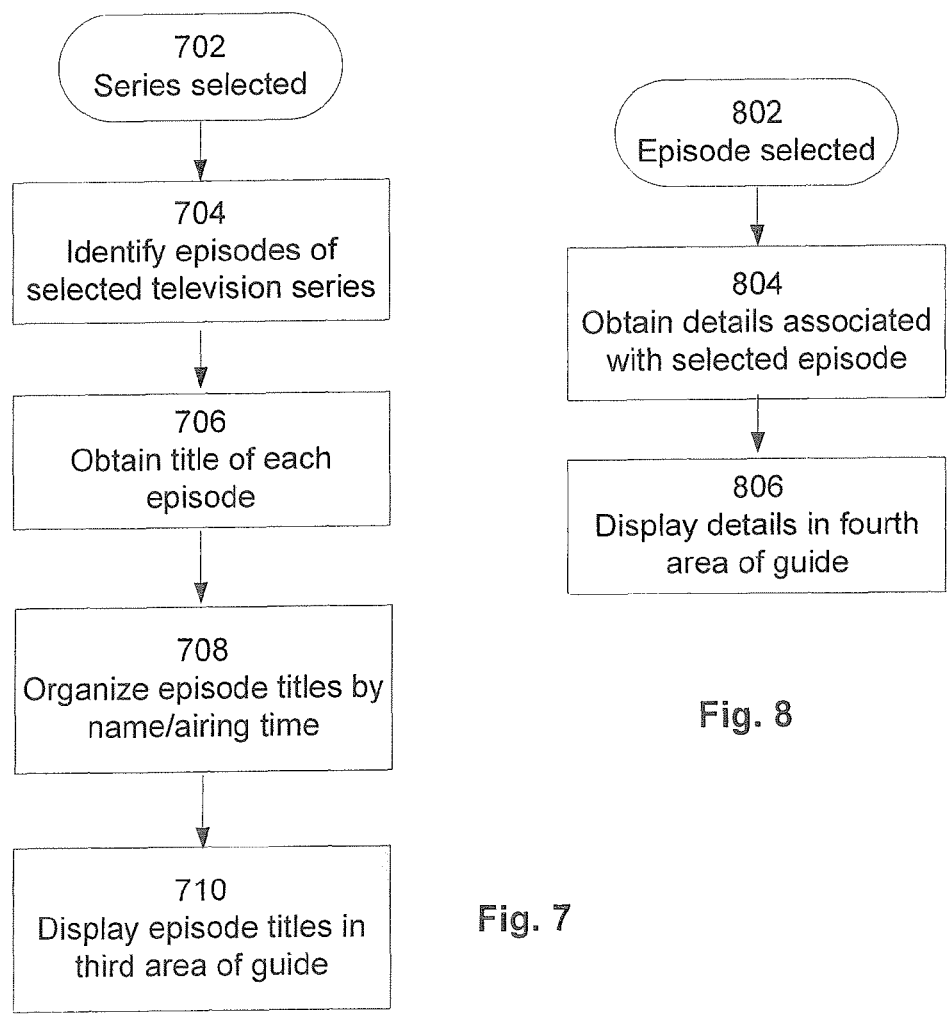
Fig. 7
Fig. 8

NON-GRID TELEVISION GUIDE

BACKGROUND

The way people consume television is changing dramatically. Previously, a consumer had to watch a television program the night it aired. However, the introduction of the personal video recorder (PVR) and video on demand (VOD) services now provides the consumer the ability to watch a television program during other times. The original airing time of the television program is no longer the most important piece of information relating to the program itself. In fact, the airing time of the television program is irrelevant as long as the consumer requests recording of the television program prior to the airing time or the television program is available on video on-demand ("VoD").

Scheduling the recording of a television program is often done via an electronic program guide (EPG). Conventional EPGs are displayed on a grid. Typically, the vertical axis of the EPG grid displays the available channels and the horizontal axis of the EPG grid displays the time. Each intersection of the vertical axis (channel) with the horizontal axis (time) displays an airing of a television program. The viewer may scroll along both the horizontal axis and vertical axis to identify television programs being broadcast at different times and on different channels. The EPG provides the viewer the ability to view additional information for a television program by selecting the specific airing of the television program in the EPG.

FIG. 1 illustrates a conventional EPG 10 for selecting scheduled programs. EPG 10 may be used to schedule a recording request for a particular episode. In the EPG 10, an episode of "That '70s Show" 12 is scheduled to be broadcast between 10:00 pm and 10:30 pm on Channel 36, an episode of "SportsCenter" 14 is scheduled to be broadcast between 10:00 pm and 11:00 pm on Channel 38, the movie "Forrest Gump" 16 is scheduled to be broadcast between 10:00 pm and 11:00 pm on Channel 37 and an episode of "Good Eats" 18 is scheduled to be broadcast between 11:00 pm and 11:30 pm on channel 35. The EPG 10 restricts the user's view to a few channels at a time (6 channels at a time in the EPG 10) for a limited period of time (90 minutes in the EPG 10).

SUMMARY

One aspect of the present technology is to provide a non-grid EPG that emphasizes content and de-emphasizes time. The program guide is divided into four display windows: A first window that displays available television channels, a second window that displays available television series, a third window that displays episodes, and a fourth window that displays episode details. Selecting a television channel displayed in the first window of the EPG filters the television series displayed in the second window of the EPG. Selecting a television series in the second window of the EPG filters the episodes displayed in the third window of the EPG.

One aspect of the present technology is to provide a non-grid EPG that organizes all available television episode contained in a program guide database by content. The non-grid EPG obtains channel and episode information from a program guide database. Based on a selection of a television channel by the viewer, the non-grid EPG displays television series in the second window of the EPG that only air on the selected television channel and contain at least one episode in the program guide database. If the program guide database contains episodes for a fourteen day period, the second window of the EPG will display all television series that air on the selected channel that also includes at least one episode within the next fourteen days. By selecting one of the television series, the non-grid EPG will display every episode of the television series that airs in the next fourteen days.

One aspect of the present technology is provide a user interface that does not limit the display of available programming to a specific time period. The user interface narrows the choices of available programming based on channel selection and television series selection. If the viewer selects a specific television channel, the user interface narrows the choice or available programming to the television series that air on the selected television channel. The choices of television series are displayed regardless of when an episode of the television series airs. This allows the viewer to easily select the content they want to watch without having to scroll through a grid-based EPG. Selecting a specific television series displays the episodes of the selected television series that are available to the viewer. This content-based user interface allows a viewer to select programming without having to scroll through channels and airing times.

BRIEF DESCRIPTION OF THE DRAWINGS

FIG. 1 depicts an exemplary electronic program guide, according to the prior art.

FIG. 7 depicts a flow diagram illustrating exemplary steps of displaying episodes in a third window of the non-grid EPG.

FIG. 8 depicts a flow diagram illustrating exemplary steps of displaying episode details in a fourth window of the non-grid EPG.

DETAILED DESCRIPTION

The technology described herein provides a non-grid EPG. An EPG is generated that includes four separate windows. The first window displays available television channels. The second window displays available television series. The third window displays available television episodes. The fourth window displays episode details. Upon selecting a television channel in the first window, the television series displayed in the second window are filtered to television series that air on the selected television channel and have an episode in the program guide database. Upon selecting a television series, all available episodes of the selected television series are displayed in a third window of the EPG. The details of a selected episode are displayed in a fourth window.

Figure 2:
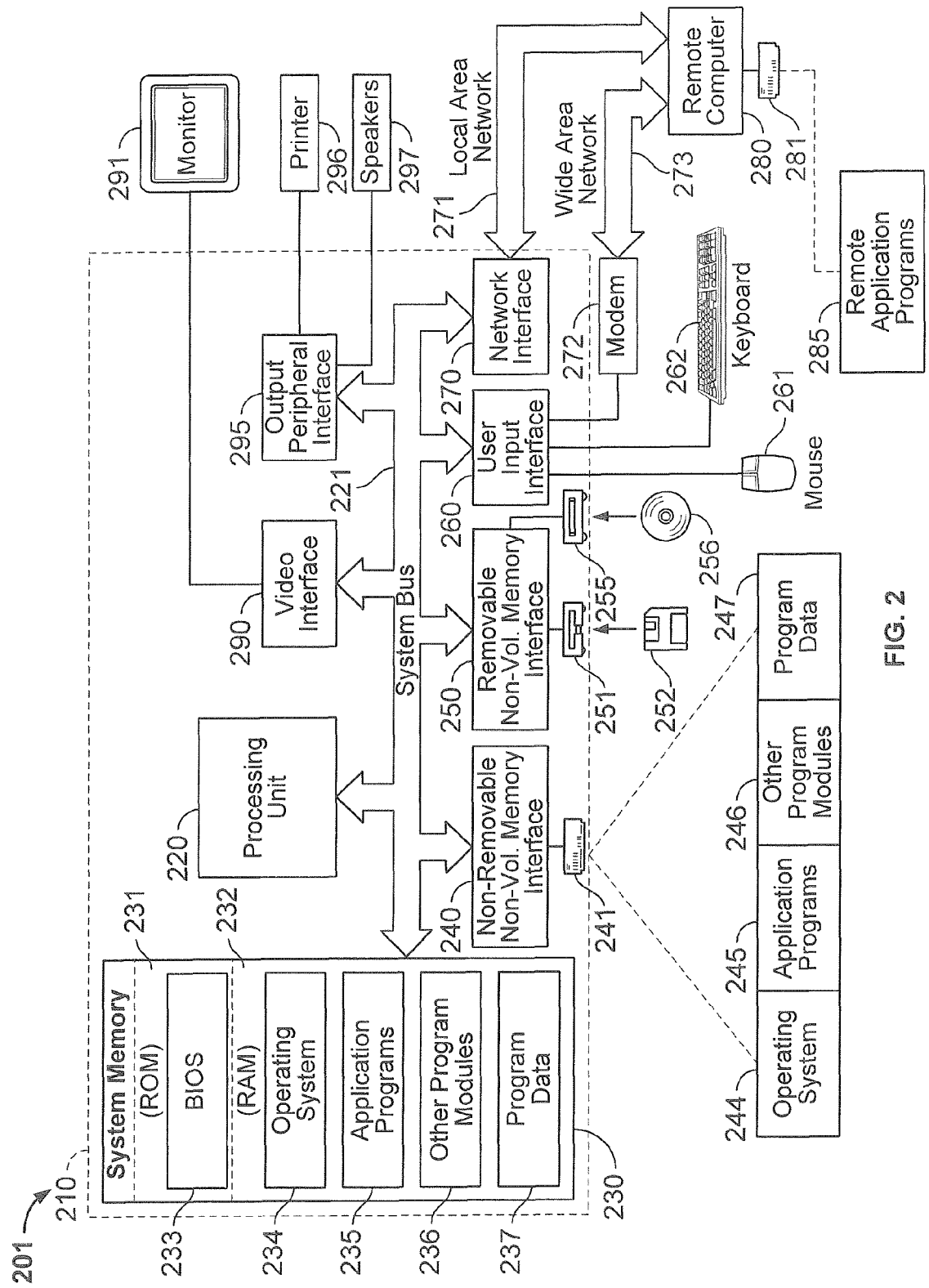
FIG. 2 depicts a block diagram of a computer system for performing the methods described herein.

The present technology will now be described in reference to FIGS. 2-8. FIG. 2 illustrates an example of a suitable general computing system environment 201 for generating a recording schedule. It is understood that the term "processing device" as used herein broadly applies to any digital or computing device or system. The computing system environment 201 is only one example of a suitable computing environment and is not intended to suggest any limitation as to the scope of use or functionality of the inventive system. Neither should the computing system environment 201 be interpreted as having any dependency or requirement relating to any one or combination of components illustrated in the exemplary computing system environment 201.

With reference to FIG. 2, an exemplary system for implementing the inventive system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 may include a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 230 includes computer storage media in the form of volatile and/or nonvolatile memory such as ROM 231 and RAM 232. A basic input/output system (BIOS) 233, containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disc drive 241 that reads from or writes to non-removable, nonvolatile magnetic media and a magnetic disc drive 251 that reads from or writes to a removable, nonvolatile magnetic disc 252. Computer 210 may further include an optical media reading device 255 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 241 is typically connected to the system bus 221 through a non-removable memory interface such as interface 240. Magnetic disc drive 251 and optical media reading device 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disc drive 241 is illustrated as storing operating system 244, application programs 245, other program modules 246, and program data 247. These components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262 and a pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local window network (LAN) 271 and a wide window network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communication over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communication link between the computers may be used.

Figure 3:
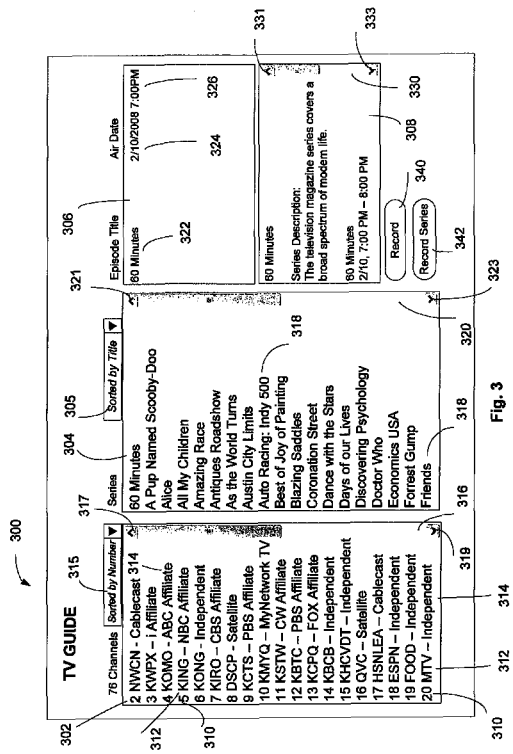
FIG. 3 depicts an exemplary drawing of an embodiment of a non-grid EPG.

FIG. 3 illustrates one embodiment of a non-grid electronic program guide. The program guide 300 includes a first display window 302, a second display window 304, a third display window 306 and a fourth display window 308.

The first window 302 displays available television channels. As will be described in more detail later, the television channels are obtained from a program guide database. Each television channel displayed in the first window 302 includes a channel number 310, the channel call letters 312 and a channel description 314. In FIG. 3, Channel 20 is displayed in the first window 302 by its channel number 310 (20), call letters MTV 312 and description 314 (Independent). Channel 5 is displayed in the first window 302 by its channel number 310 (5), call letters 312 (KING) and channel description 314 (NBC Affiliate). For purposes of describing the technology only, channel 5 is a local NBC affiliate. Thus, the description 314 for Channel 5 is "NBC Affiliate." Displaying the affiliate haleps the viewer identify the broadcaster.

A drop-down menu 315 allows the viewer to organize how the television channels are displayed in the first window 302. FIG. 3 illustrates that the menu item "Sorted by Number" has been selected. In this case, the television channels are displayed in the first window 302 in numerical order by channel number 310. By way of example only, another menu item available in the drop-down menu 315 may be "Sorted by call letters" (not shown). If this menu item is selected, the television channels are displayed in alphabetical order by channel call letters 312. The television channels displayed in the first window 302 may be organized in other ways. Due to the limited display area of the first window 302, more television channels are identified in the program guide database than can be displayed at one time in the first window 302. In this case, a scroll bar 316 is provided in the fist window 302 to allow the viewer to view all identified television channels.

The second window 304 displays available television series. 318. The program guide 300 shown in FIG. 3 illustrates an example of a default program guide (e.g., when the program guide 300 is first opened and before a television channel has been selected in the first window 302). As will be discussed in more detail later, the program guide, when opened, identifies all available television channels and all the episodes that may be viewed on these television channels in a program guide database. As discussed above, all available television channels are displayed in the first window 302. In one embodiment, all television series that may be viewed on any of the available television channels are initially displayed in the second window 304. The EPG 300 shown in FIG. 3 displays that seventy-six channels are available. Any number of television channels may be displayed in the first window 302. In this default mode, all television series 318 that air on any of the seventy-six television channels are initially displayed in the second window 304. In another embodiment, the first channel displayed in the first window 302 is automatically selected. Therefore, only the televisions series 318 that air on channel 2 are displayed in the second window 304.

Some of the television series 318 shown in the EPG in FIG. 3 include "60 Minutes," "Friends," "Auto racing: Indy 500" and "Forrest Gump." As will be discussed in more detail later, every available episode is identified in the program guide database. If more than one episode of a television series is identified in the program guide database, the series title is displayed in the second window 304 and not each episode. If only a single episode (also referred to as a "one-off broadcast") is identified in the program guide database, the episode title is displayed in the second window 304. For the purpose of describing the technology only, two episodes of "60 Minutes," five episode of "Friends," one episode of the Indianapolis 500 race and two episodes of the movie "Forrest Gump" were identified in the program guide database.

A drop-down menu 305 is associated with the second window 304. FIG. 3 illustrates that the menu item "Sorted by Title" has been selected. When this item is selected in the drop-down menu 305, the television series 318 are displayed in the second window 304 in alphabetical order by series title. The drop-down menu 305 may also include other menu items such as, by way of example only, "Sorted by airing time," "Sports only," "Movies only," and so on. Selecting any of these menu items in the drop-down menu 305 organizes the series titles 318 by the item. If, by way of example only, the "Sorted by airing time" item was selected, the series titles 318 will be displayed in order of episode airing time. Due to the limited viewing area of the second window 304, it may not be possible to display all available television series in the second window 304 at the same time. In this case, a scroll bar 320 is provided in the second window 304 to allow the viewer to view all identified television series.

The third window 306 displays available television episodes 322. When the program guide 300 is opened, the episode 322 initially displayed in the third window 306 is an episode of the first television series 318 displayed in the second window 304. If more than one episode of the television series 318 exists in the program guide database, each available episode is displayed in the third window 306. In FIG. 3, the first television series displayed in the second window 304 is "60 Minutes". For the purpose of describing this technology only, one episode of "60 Minutes" was identified in the program guide database. Therefore, that single episode 322 of "60 Minutes" is displayed in the third window 306. In one embodiment, the air date 324 and air time 326 of the "60 Minutes" episode is also displayed in the third window 306. In an alternative embodiment, only the episode title is displayed in the third window 306.

The fourth window 308 displays details of the "60 Minutes" episode 322 shown in the third window 306. As will be discussed in more detail later, the episode details displayed in the fourth window 308 are obtained from the content metadata associated with the episode. In FIG. 3, the episode details include a series description, series title ("60 Minutes"), airing date (February 10), airing time (7:00 PM-8:00 PM), channel, television affiliate, original air date, series category and television rating. Other details may also be displayed in the fourth window 308. Due to the limited viewing area of the fourth window 308, it is often not possible to display all the episode details in the fourth display window 308 at one time. In that case, a scroll bar 330 is provided in the fourth window 308 to allow the viewer to view all episode details.

Figure 4:
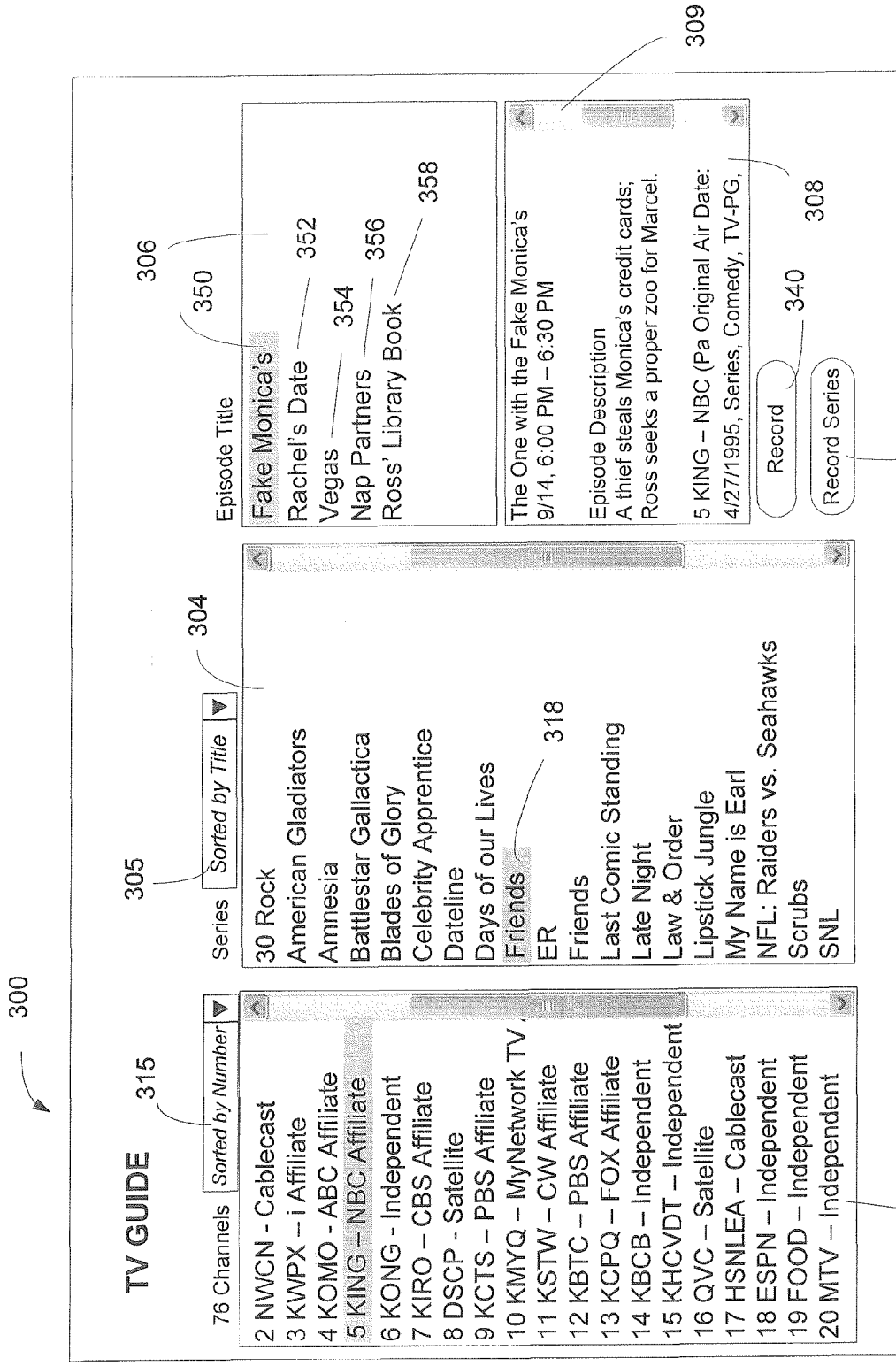
FIG. 4 depicts an exemplary drawing of another embodiment of a non-grid EPG.

FIG. 4 illustrates the electronic program guide 300 after a television channel has been selected in the first window 302. For purposes of describing the technology only, Channel 5 (KING—NBC Affiliate) has been selected in the first window 302 (illustrated as highlighted). In response to the selection of channel 5 in the first window 302, the television series 318 displayed in the second window 304 shown in FIG. 3 have been narrowed or filtered to only the television series 318 that air on the selected television channel, ch. 5. Some of the television series 318 displayed in the second window 304 include "30 Rock," "Dateline" and "Friends."

In FIG. 4, the television series 318 are displayed in the second window 304 in alphabetical order by series title. The television series 318 "Friends" has been selected in the second window 304 (illustrated as highlighted). As will be described in more detail later, the third window 306 only displays episodes of the selected television series. Here, the third window 306 displays all episodes of "Friends" that air on channel 5 that were identified in the program guide database. The episode 322 titled "Fake Monica's" is selected in the third window 306. Thus, the fourth window 308 of the program guide 300 displays the details of the "Fake Monica's" episode. As shown in FIG. 4, the details displayed in the fourth window 308 include the airing date (September 14), the airing time (6:00 PM-6:30 PM), a brief description of the episode, the television channel the episode airs on (5 KING), the original air date (Apr. 27, 1995), and so on.

In the FIG. 4 embodiment, the "record" button 340, when selected, transmits recording instructions to a recording device to record the episode selected in the third window 306. In FIG. 4, the "Fake Monica's" episode 322 is selected in the third window 306. Thus, selecting the "record" button 340 will allow the viewer to record the "Fake Monica's" episode. Selecting the "record series" button 342 transmits recording instructions to a recording device to record all episodes in the selected television series. In FIG. 4, the television series 318 "Friends" is selected in the second window 304. Thus, selecting the "record series" button 342 records all episodes of "Friends" contained in the program guide database.

Figure 5:
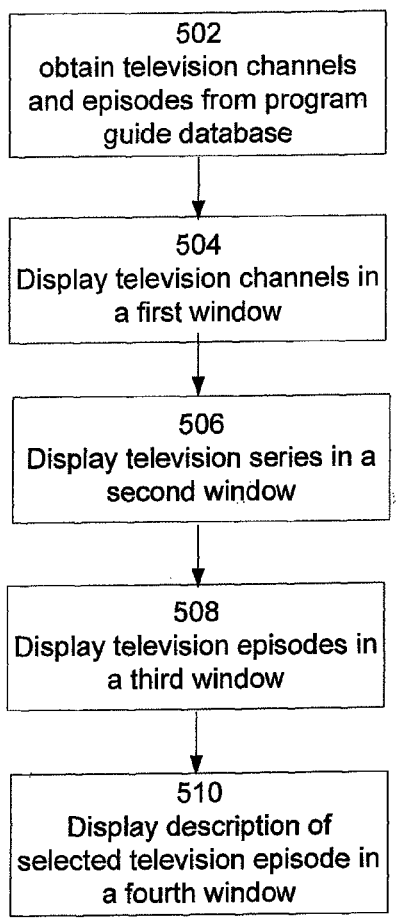
FIG. 5 depicts a flow diagram illustrating exemplary steps of displaying the information obtained from the program guide database into the different windows of the non-grid EPG.

FIG. 5 illustrates exemplary steps for displaying the television channel and episode information in each of the windows of the non-grid program guide 300. In step 502, the available television channels and episodes are obtained from a program guide database. In step 504, the television channels obtained in step 502 are displayed in the first window 302 of the guide 300. In one embodiment, the television channels are displayed in the first window 302 in numerical order by channel number. In an alternative embodiment, the television channels are displayed in the first window 302 in alphabetical order by channel call letters. In step 506, the television series associated with the television episodes (identified in step 502) are displayed in the second window 304 of the guide 300. More detail is provided later describing step 506. In step 508, the television episodes of one of the television series displayed in the second window 304 are displayed in the third window 306 of the guide 300. In step 510, the details of one of the episodes displayed in the third window 306 is displayed in the fourth window 308.

Figure 6:
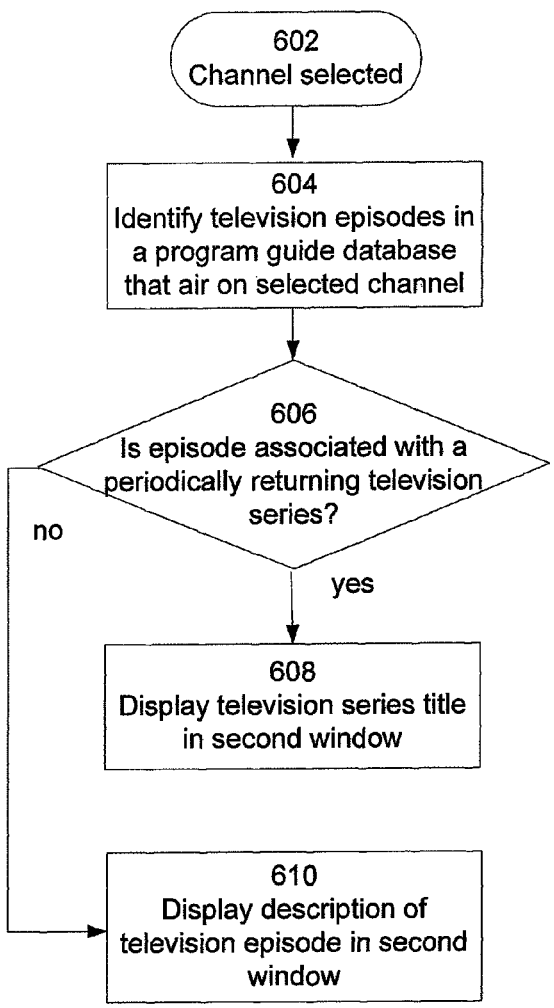
FIG. 6 depicts a flow diagram illustrating exemplary steps of displaying the available television series in a second window of the non-grid EPG.

FIG. 6 illustrates exemplary steps for displaying television series 318 in the second window 304 of the electronic program guide 300. In step 602, a television channel has been selected in the first window 302 of the electronic program guide 300. In FIG. 4, the viewer selected channel 5 in the first window 302.

In step 604, every episode contained in the program guide database that airs on channel 5 is identified. A program guide database may comprise any television listing service such as, by way of example only, Zap2It®, Yahoo!® TV and the like. For the purpose of describing this technology only, the program guide database contains episode listings for a fourteen day period and is updated daily. Thus, in step 604, every episode that airs on channel 5 during the fourteen day period is identified in the program guide database. Episodes that air on ch. 5, which is an NBC affiliate, NBC may include national and local broadcasts of television programs (e.g., "30 Rock," "American Gladiators," "Dateline," "Friends," "The Office" and local news), sporting events (e.g., MLB baseball games, NFL football games, etc.), movies, and the like.

Episodes vary in length. An episode of a television sitcom such as "Friends" or "30 Rock" are typically thirty minutes, an episode of a news program such as "Dateline" are typically sixty minute episodes, and episodes of sporting events and movies vary greatly in length. If every episode that airs on ch. 5 in the next fourteen days is a thirty-minute episode, six hundred and seventy-two episodes would be identified in, in step 604. If any episode that airs on ch. 5 in the next fourteen days is longer than thirty minutes, fewer episodes are identified in step 604. More than one episode of the same television series may air within the next fourteen days. Using the example provided above, the television series "Friends" airs every Thursday night on ch. 5, and repeats of "Friends" are likely airing on other channels. Thus, at least two episodes of "Friends" will be identified in step 604.

In step 606, for each episode identified in step 604, it is determined whether the episode is associated with a periodically returning television series. If the episode is a broadcast of "Friends," then the episode is associated with the periodically returning television series "Friends." When the episode is associated with such a television series in step 606, the television series title is displayed in the second window 304 of the electronic program guide 300, in step 608. In FIG. 4, the television series title 318 "Friends" is displayed in the second window 302 of the electronic guide 300. As discussed above, multiple episodes of "Friends" may be identified in the program guide database in step 604. Regardless of the number of episodes identified in step 604, the television series title "Friends" will be displayed in the second window 604 only once.

If the episode is, however, a one-off broadcast of an NFL game between the Oakland Raiders and Seattle Seahawks, the episode is not associated with a periodically returning television series. The same is true for a broadcast of a movie (e.g., "Forrest Gump"). However, if the movie airs more than once in the next fourteen days, each airing of the movie may be identified as an episode of a periodically returning television series. If the episode is a one-off broadcast, a description of the episode is displayed in the second window 304 of the electronic guide 300, in step 610. In step 604, one airing of the Oakland Raiders vs. Seattle Seahawks NFL game and one airing of the movie "Blades of Glory" were identified in the program guide database. Therefore, the descriptions "NFL: Raiders vs. Seahawks" and "Blades of Glory" are displayed in the second window 304 of the electronic guide 300 (See FIG. 3).

FIG. 7 illustrates exemplary steps of displaying episodes 322 in the third window 306 of the electronic program guide 300. In step 702, one of the television series 318 displayed in the second window 304 is selected. In FIG. 4, the television series 318 "Friends" has been selected in the second window 304. Previously, channel 5 was selected in the first window 302. In step 704, episodes of the selected television series 318 "Friends" are identified. Because channel 5 is selected in the first window 302, only episode of "Friends" that are identified in the program guide database that also air on channel 5 are identified.

For the purpose of describing the technology only, five episodes of "Friends" were identified in the program guide database, in step 704. Each episode has an associated set of rich descriptors forming content metadata. Examples of content metadata include the episode description, the episode category, the episode title and the like. In step 706, the episode title of each "Friends" episode that was identified in step 704 is obtained. In step 708, the episode titles are organized. In one embodiment, the episode titles are organized in alphabetical order by series title. In an alternative embodiment, the episode titles are organized according to episode airing time.

In step 710, the episode titles 322 are displayed in the third window 706 of the electronic program guide 300. In FIG. 4, the five episode titles are displayed in the third window 706 of the program guide 300: "Fake Monica's" 350, "Rachel's Date" 352, "Nap Partners" 356 and "Ross'Library Book" 358. In the FIG. 4 embodiment, the air date and airing time of each episode is not displayed in the third window 706 of program guide 300 (as shown in FIG. 3). It is within the scope and spirit of the technology to display the airing time and date associated with each episode, similar to that shown in FIG. 3.

FIG. 8 illustrates exemplary steps for displaying episode details in the fourth window 308 of the program guide 300. In step 802, one of the episodes titles 322 displayed in the third window 306 is selected. For the purpose of describing the technology only, the "Fake Monica's" episode 350 has been selected (see FIG. 4). In step 804, the episode details associated with the "Fake Monica's" episode 350 is obtained. Again, the episode details are obtained from the content metadata associated with the selected episode. In step 806, the episode details are displayed in the fourth window 308. In one embodiment, all of the metadata content obtained in step 804 is displayed in the fourth window 308. In an alternative embodiment, a predetermined portion of the metadata content obtained in step 804 is displayed in the fourth window 708. FIG. 4 provides one example of displaying episode details. Other formats are within the scope of the technology. If all the episode details cannot be displayed in the fourth window 308 at one time, a scroll bar 309 is provided in the fourth window 308 to allow the viewer to view all the available information.

Figure 9:
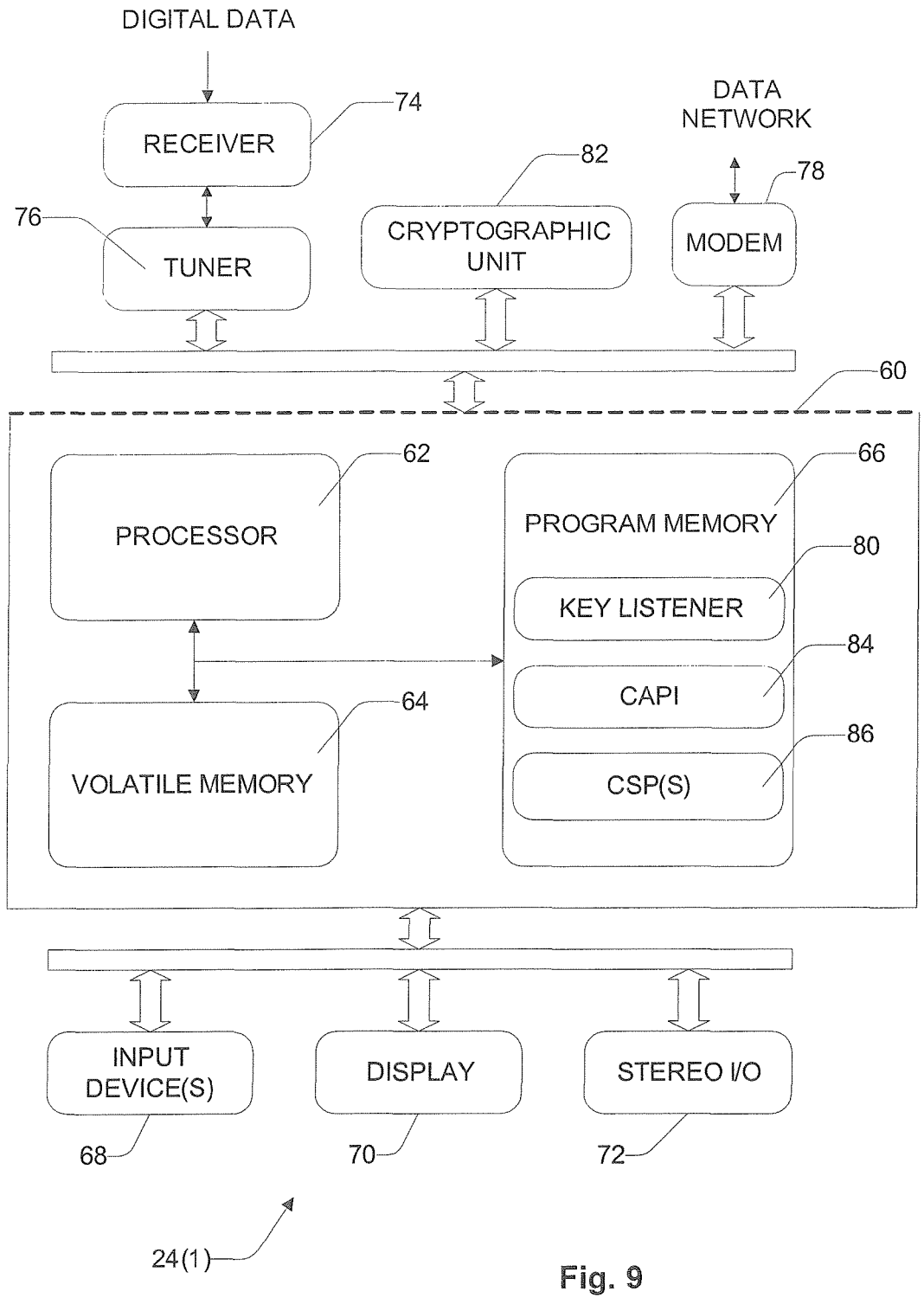
FIG. 9 depicts a block diagram of a digital recording device.

FIG. 9 shows an exemplary configuration of a processing device, authorized client 24(1), implemented as a broadcast-enabled computer. It includes a central processing unit 60 having a processor 62, volatile memory 64 (e.g., RAM), and program memory 66 (e.g., ROM, Flash, disk drive, floppy disk drive, CD-ROM, etc.). The client 24(1) has one or more input devices 68 (e.g., keyboard, mouse, etc.), a computer display 70 (e.g., VGA, SVGA), and a stereo I/O 72 for interfacing with a stereo system.

The client 24(1) includes a digital broadcast receiver 74 (e.g., satellite dish receiver, RF receiver, microwave receiver, multicast listener, etc.) and a tuner 76 which tunes to appropriate frequencies or addresses of the broadcast network. The tuner 76 is configured to receive digital broadcast data in a particularized format, such as MPEG-encoded digital video and audio data, as well as digital data in many different forms, including software programs and programming information in the form of data files. The client 24(1) also has a modem 78 which provides dial-up access to the data network 28 to provide a back channel or direct link to the content servers 22. In other implementations of a back channel, the modem 78 might be replaced by a network card, or an RF receiver, or other type of port/receiver which provides access to the back channel.

The client 24(1) runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® XP or Windows® VISTA or other derivative versions of Windows®. It is noted, however, that other operating systems which provide windowing environments may be employed, such as the Macintosh operating system from Apple Computer, Inc. and the OS/2 operating system from IBM.

The client 24(1) is illustrated with a key listener 80 to receive the authorization and session keys transmitted from the server. The keys received by listener 80 are used by the cryptographic security services implemented at the client to enable decryption of the session keys and data. Cryptographic services are implemented through a combination of hardware and software. A secure, tamper-resistant hardware unit 82 is provided external to the CPU 60 and two software layers 84, 86 executing on the processor 62 are used to facilitate access to the resources on the cryptographic hardware 82.

The software layers include a cryptographic application program interface (CAPI) 84 which provides functionality to any application seeking cryptographic services (e.g., encryption, decryption, signing, or verification). One or more cryptographic service providers (CSPs) 86 implement the functionality presented by the CAPI to the application. The CAPI layer 84 selects the appropriate CSP for performing the requested cryptographic function. The CSPs 86 perform various cryptographic functions such as encryption key management, encryption/decryption services, hashing routines, digital signing, and authentication tasks in conjunction with the cryptographic unit 82. A different CSP might be configured to handle specific functions, such as encryption, decryption, signing, etc., although a single CSP can be implemented to handle them all. The CSPs 86 can be implemented as dynamic linked libraries (DLLs) that are loaded on demand by the CAPI, and which can then be called by an application through the CAPI 84.

Figure 10:
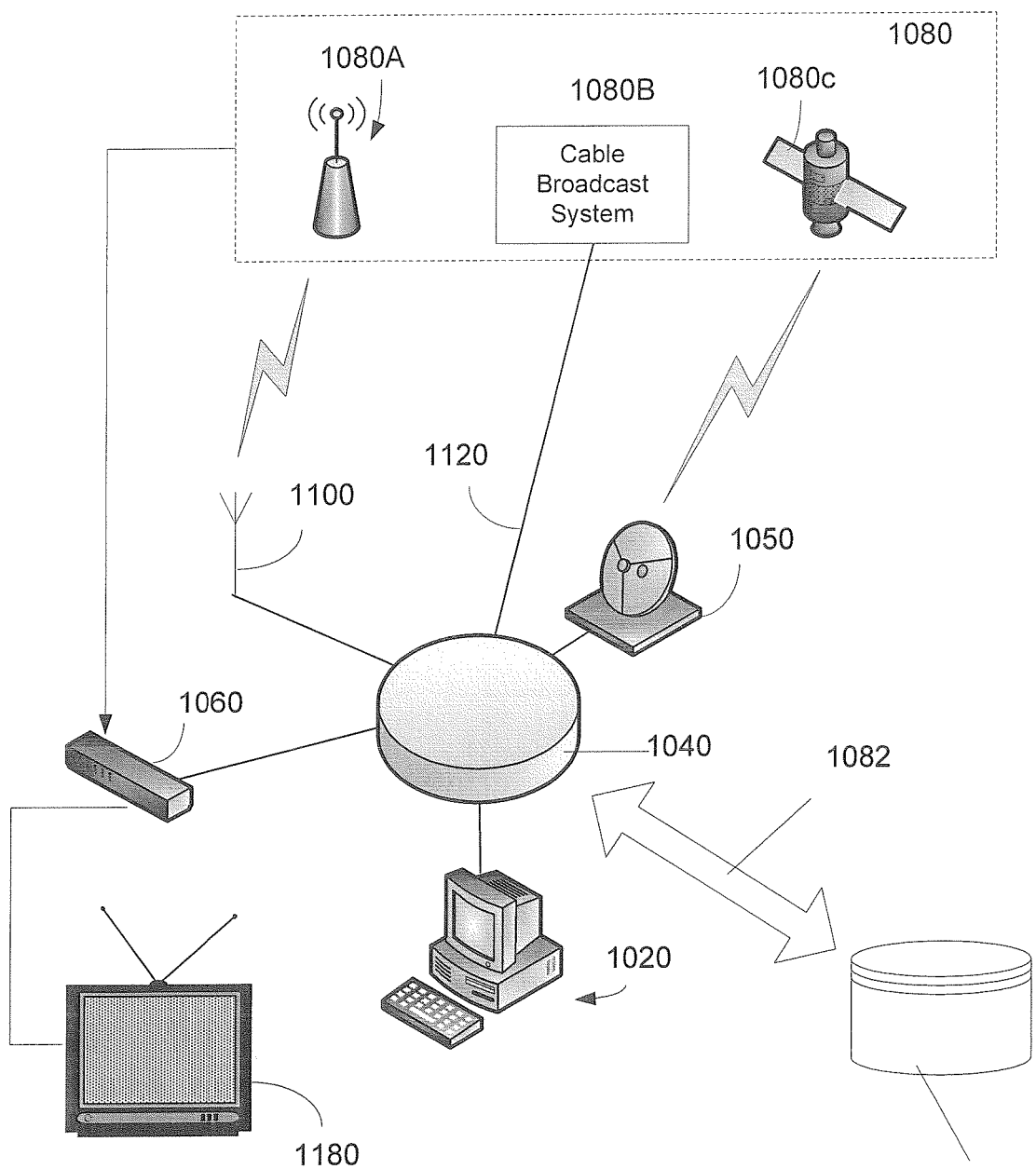
FIG. 10 depicts an exemplary television viewing environment suitable for obtaining content from a program guide database.

FIG. 10 illustrates an exemplary environment 1000 suitable for automatically setting up TV signals in a tuner device. The environment 1000, in this embodiment, includes a PC 1020, an antenna 1100, a cable system 1120, a satellite dish 1050, a set-top box 1060 and a television 1180. Each of these hardware components are connected together by a network 1040. The environment 1000 also includes a broadcast system 1080 (described in more detail later).

In the exemplary environment 1000, the tuner device will be referred to as the PC 1020. The tuner device may also be implemented as any number of other devices employing one or more tuners configurable in a variety of ways for receiving TV signals. The tuner device may also refer to the set-top box 1060, a personal video recorders (PVRs), the television sets 1180, and so on. FIG. 10 illustrates that the television set 1180 is connected to the set-top box 1060. The television set 1180 may also be connected to other devices such as, for example, the personal computer (PC) 1020, the cable system 1120, and so on. For purposes of describing this technology herein, the tuner device will be referred to as the PC 1020.

The exemplary environment 1000 of FIG. 10 also illustrates the availability of several different TV signal sources 1080. A user is most likely to subscribe to or use one or more of these sources 1080. These sources include a terrestrial/OTA (over the air) television broadcast system 1080a, a cable broadcast system 1080b and a satellite broadcast system 1080c. The exemplary environment 1000 illustrates that these signal sources 1080 may be input to PC 1020 directly (e.g., through RF antenna 1100, cable 1120, or satellite dish 1050), or they may be input to PC 1020 through a network 1040 or set-top box (STB) 1060.

STB 1060 performs the functions of a conventional unit of this nature, such as controlling channel selection and decoding premium broadcast channels. STB 1060 may select from different available physical sources 1080. Thus, STB 1060 may have interfaces that connect to an RF antenna 1100 for receiving terrestrial broadcasts, a cable 1120 for receiving cable broadcasts, or a satellite dish 1050 for receiving satellite broadcasts.

FIG. 10 also illustrates that the network 1040 communicates with the program guide database 1084 via a second network 1082. Many different devices are connected to the network 1040, including the PC 1020, antenna 1100, cable system 1120, satellite dish 1050, set-top box 1060 and television 1180 shown in FIG. 10. Thus, any one of these devices may identify and store the available television channels and episodes in the program guide database 1084. The other devices may obtain the contents of the program guide database 1084 from the device that downloaded the contents.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for displaying an electronic program guide, comprising the steps of:
   (a) displaying available television channels in a first window of the electronic program guide;
   (b) displaying television series that air on the available television channels in a second window of the electronic program guide, displaying the television series in the second window of the electronic program guide including the steps of:
      (i) for each episode identified in a program guide database, determining if the episode is associated with a periodically returning television series, the periodically returning television series including a plurality of different episodes with each episode corresponding to a different program content;
      (ii) in response to determining that the episode is associated with the periodically retuning television series, displaying only the television series name of the periodically retuning television series in the second window of the electronic program guide;
      (iii) in response to determining that the episode is not associated with the periodically returning television series, displaying the episode name of the episode that is not associated with the periodically returning television series in the second window of the electronic program guide;
   (c) displaying episodes that air on the available television channels in a third window of the electronic program guide, displaying the episodes in the third window of the electronic program guide including the steps of:
      (i) in response to a selection of one of the television series displayed in the second window of the electronic program guide, displaying all episodes of the selected television series in the third window of the guide; and
   (d) displaying episode information in a fourth window of the guide, the episode information displayed in the fourth window of the guide is in response to a selection of one of the episodes displayed in the third window of the guide;
   said first window, said second window, said third window, and said fourth window of said electronic program guide are displayed simultaneously.

2. The method as recited in claim 1, wherein the step (a) of displaying available television channels in a first window of the electronic program guide comprises the steps of:
   (i) identifying available television channels in the program guide database; and
   (ii) populating the first window of the electronic program guide with the available television channels identified in step (a)(i).

3. The method as recited in claim 1, wherein the step (a) of displaying available television channels in a first window of the electronic program guide comprises the step of displaying available television channels in order according to one of the following: television channel number and television channel name.

4. The method as recited in claim 1, wherein the step (b) of displaying television series in a second window of the electronic program guide comprises the step of displaying television series titles in order according to one of the following: television series name and airing time of an episode associated with the television series.

5. The method as recited in claim 1, further comprising the step of:
   (e) displaying a first recording icon and a second recording icon, wherein selecting the first recording icon provides recording instructions to a recording device to record the episode selected in the third window of the electronic program guide, wherein selecting the second recording icon provides recording instructions to the recording device to record every episode of the television series selected in the second window of the electronic program guide.

6. The method as recited in claim 1, wherein the step (d) of displaying episode information in a fourth window of the guide comprises the steps of:
   (i) obtaining the metadata associated with the episode selected in the third window of the electronic program guide; and
   (ii) displaying the metadata obtained in step (d)(i) in the fourth window of the electronic program guide.

7. The method as recited in claim 1, wherein the step (c) of displaying episodes in a third window of the electronic program guide comprises the steps of:
   (i) in response to the selection of one of the television series displayed in the second window of the electronic program guide, identifying all episodes of the selected television series that air on the available television channels selected in the first window;
   (ii) obtaining the episode title of each episode identified in step (c)(i); and
   (iii) displaying all episode titles identified in step (c)(ii) in the third window of the electronic program guide.

8. A method for displaying an electronic program guide, comprising the steps of:
- (a) identifying television channels and episodes contained in a program guide database;
- (b) displaying the television channels identified in step (a) in a first window of the electronic program guide;
- (c) in response to the selection of one of the television channels displayed in the first window of the electronic program guide, displaying television series that air on the selected television channel in a second window of the electronic program guide, displaying the television series in the second window of the electronic program guide including the steps of:
  - (i) for each television episode contained in the program guide database that airs on the selected television channel, determining whether the television episode is associated with a periodically returning television series comprising a plurality of different episodes with each episode corresponding to a different program content or is a one-off broadcast;
  - (ii) in response to determining that the episode is associated with the periodically retuning television series, displaying only the television series title of the periodically retuning television series in the second window of the electronic program guide;
  - (iii) in response to determining that the episode is not associated with the periodically returning television series, displaying the episode title of the episode that is not associated with the periodically returning television series in the second window of the electronic program guide;
- (d) in response to the selection of one of the television series displayed in the second window of the electronic program guide, displaying all episodes of the selected television series that air on the selected television channel in a third window of the electronic program guide; and
- (e) in response to the selection of one of the episodes displayed in the third window of the electronic program guide, displaying information associated with the selected episode in a fourth window of the electronic program guide;
- said first window, said second window, said third window, and said fourth window of said electronic program guide are displayed simultaneously.

9. The method as recited in claim 8, wherein step (b) of displaying television channels identified in step (a) in a first window of the electronic program guide comprises the step of displaying the television channels in the first window of the electronic program guide in order of one of the following: television channel number and television channel call letters.

10. The method as recited in claim 8, wherein step (c) of displaying television series that air on the selected television channel in the second window of the electronic program guide comprises the step of displaying the television series titles and episode titles in the second window of the electronic program guide in alphabetical order.

11. The method as recited in claim 8, wherein step (d) of displaying episodes of the selected television series in a third window of the electronic program guide comprises the steps of:
- (i) identifying all episodes of the selected television series that air on the selected television channel contained in the program guide database;
- (ii) obtaining the episode title of each episode identified in step (d)(i); and
- (iii) displaying the episode titles obtained in step (d)(ii) in the third window of the electronic program guide.

12. The method as recited in claim 11, wherein step (d)(iii) of displaying the episode titles obtained in step (d)(ii) in the third window of the electronic program guide comprises the step of displaying the episode titles in the third window of the electronic program guide in order of airing time.

13. One or more processor readable storage devices having processor readable code embodied on computer storage media devices, the processor readable code for programming one or more processors to display a non-grid television guide, comprising the steps of:
- (a) identifying television channels contained in a program guide database;
- (b) identifying episodes that air on the television channels identified in step (a);
- (c) populating a first window of the television guide with the television channels identified in step (a);
- (d) in response to a selection of one of the television channels, identifying the television episodes identified in step (b) that air on the selected television channel, and for each television episode identified in step (d):
  - (i) determining whether the television episode is associated with a periodically returning television series or is a one-off broadcast, the periodically returning television series comprising a plurality of different episodes with each episode corresponding to a different program content;
  - (ii) in response to determining that the television episode is associated with the periodically returning television series, populating a second window of the television guide with only a title of the periodically returning television series; and
  - (iii) in response to determining that the television episode is a one-off broadcast, populating the second window of the television guide with a description of the television episode;
- (e) in response to a selection of one of the television series, populating a third window of the television guide with all television episodes of the selected television series;
- (f) in response to a selection of one of the television episodes, populating a fourth window of the television guide with information associated with the selected television episode; and
- (g) simultaneously displaying the first window, the second window, the third window, and the fourth window of the non-grid television guide.

14. The one or more processor readable storage devices as recited in claim 13, wherein step (d) of populating a second window of the television guide with television series comprises the step of displaying the television series in the second window of the television guide in order of one of the following: alphabetical order by television series titles and airing time of the earliest airing episode in the television series.

15. The one or more processor readable storage devices as recited in claim 13, wherein step (e) of populating a third window of the television guide with titles of the television episodes of the selected television series title comprises the steps of:
- (i) identifying the television episodes that are associated with the selected television series;
- (ii) for each episode identified in step (e)(i), obtaining the television episode title; and
- (iii) populating the third window of the television guide with the television episode titles obtained in step (e)(ii).

16. The one or more processor readable storage devices as recited in claim 15, wherein step (e)(iii) of populating the third window of the television guide with the television episode titles obtained in step (e)(ii) comprises the steps of:
  (i) for each television episode obtained in step (e)(ii), identifying the airing time associated with the television episode; and
  (ii) populating the third window of the television guide with the television episode titles obtained in step (e)(ii) in order of airing time.

17. The one or more processor readable storage devices as recited in claim 13, wherein step (f) of populating a fourth window of the television guide with information associated with the selected television episode comprises the steps of:
  (i) obtaining the metadata associated with the selected television episode; and
  (ii) populating the fourth window of the television guide with the metadata obtained in step (f)(i).

* * * * *